United States Patent
Kwisthout et al.

(10) Patent No.: US 8,702,260 B2
(45) Date of Patent: Apr. 22, 2014

(54) AMBIENCE LIGHTING SYSTEM FOR A DISPLAY DEVICE

(75) Inventors: Cornelis Wilhelmus Kwisthout, Eindhoven (NL); Theodorus Franciscus Emilius Maria Overes, Eindhoven (NL); Petrus Gerardus Josephus Maria Nuijens, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 471 days.

(21) Appl. No.: 13/123,793

(22) PCT Filed: Oct. 12, 2009

(86) PCT No.: PCT/IB2009/054460
§ 371 (c)(1),
(2), (4) Date: Apr. 12, 2011

(87) PCT Pub. No.: WO2010/044043
PCT Pub. Date: Apr. 22, 2010

(65) Prior Publication Data
US 2011/0194274 A1  Aug. 11, 2011

(30) Foreign Application Priority Data
Oct. 17, 2008 (EP) .................................. 08166876

(51) Int. Cl.
*G09F 13/04* (2006.01)

(52) U.S. Cl.
USPC ................ 362/97.1; 362/249.02; 362/297; 362/235

(58) Field of Classification Search
USPC ............................ 362/249.02, 235, 297, 97.1
See application file for complete search history.

(56) References Cited

U.S. PATENT DOCUMENTS

| 4,849,864 A * | 7/1989 | Forrest ........................ 362/225 |
| 7,896,522 B2 * | 3/2011 | Heller et al. .............. 362/249.02 |
| 2005/0018428 A1 * | 1/2005 | Harvey ........................ 362/297 |

FOREIGN PATENT DOCUMENTS

| GB | 308053 | 3/1929 |
| WO | 2005076602 | 8/2005 |
| WO | 2008081387 | 7/2008 |

* cited by examiner

*Primary Examiner* — Anabel Ton
(74) *Attorney, Agent, or Firm* — Shimokaji & Assoc., P.C.

(57) ABSTRACT

This invention relates to an ambience lighting system for a display device for emitting an ambience light onto a wall behind the display device. Light sources are placed at the rear side of the display device along with a reflector, where the internal arrangement of the light sources and the reflector is such that when the display device is placed in proximity to the wall the light emitted by the at least one light source becomes reflected by the reflector towards the wall such that the reflected light at least partly peripherally surrounds the viewing area of the display device.

13 Claims, 4 Drawing Sheets

AMBIENCE LIGHTING SYSTEM FOR A DISPLAY DEVICE

FIELD OF THE INVENTION

The present invention relates to an ambience lighting system for a display device for emitting an ambience light onto a wall behind the display device.

BACKGROUND OF THE INVENTION

In the recent years, so-called AmbiLight TVs have been introduced to the market. Such TVs include light sources arranged at the periphery of the TVs, which emit an ambience light onto the wall behind the TVs such that the emitted light matches the video being shown. The effect is larger virtual screen and a more immersive viewing experience.

The first generation of AmbiLight TVs required the AmbiLight system to be located near the edge of the TVs and pointing towards the wall next to the TVs. To reduce hotspot visibility, later on there was a move to keep this location but point them towards the wall behind the set and use reflectors to get the light on the wall next to the TVs. The internal arrangement of these components is such that an ambience light is emitted onto the wall behind the TVs.

FIGS. 1 a) and b) depicts graphically two variations of prior art AmbiLight TV's 104 placed at a distance d 18 from a wall 107 and comprise a thicker central section 11 at the back of the TV and a surrounding section 10. As shown here, the ambience lighting system 20 comprises a printed circuit board (PCB) 13, light emitting diode(s) (LED) 15 for emitting ambience light 16 on the wall 107, a reflector 14, an exit window 12 and an ambilight module 20 at the edge. All these components are integrated into the edge of the TVs.

Ultra thin TVs are now days becoming more and more popular. For several reasons this current approach as depicted in FIGS. 1a) and b) cannot be used in ultra thin TVs. The first reason is that positioning the light system at the edge of the TVs is obviously going to make the TVs edges thicker than TVs that do not have such AmbiLight system. Furthermore, when moving the set closer to the wall (which is preferred with thinner sets), the light path to the wall becomes shorter and shorter. This is conflicting with the required light path length when the number of light sources, e.g. LEDs, should not increase. Finally, moving the TVs closer to the wall reduces the possibilities of adding a reflector. As result of this, hotspot visibility will increase.

BRIEF DESCRIPTION OF THE INVENTION

The object of the present invention is to overcome the above mentioned drawbacks by providing an ambience lighting system that is suitable for ultra thin display devices.

According to one aspect the present invention relates to an ambience lighting system for a display device for emitting an ambience light onto a wall behind the display device, comprising:
  at least one light source placed at the rear side of the display device, and
  at least one reflector situated at the rear side of the display device,
  wherein the internal arrangement of the at least one light source and the reflector is such that when the display device is placed in proximity to the wall the light emitted by the at least one light source becomes at least partly reflected by the reflector towards the wall such that the reflected light at least partly peripherally surrounds the viewing area of the display device.

Accordingly, the fact that the light sources which in one embodiment comprises Light Emitting Diodes (LED), and the reflector are not integrated into the front part, but at the rear part makes it possible to implement the ambience lighting system in ultra thin display devices. Also, it is possible to select an internal arrangement between the at least one light source and the reflector such that the light path between the reflector and to the wall will be sufficiently long although the display device is placed very close to the wall, i.e. this lighting system allows much more design freedom. This means that all undesired light effect, e.g. LED spots, become invisible and that the required light path length necessary to minimize the number of light sources is fulfilled. Also, by moving the light sources away from the edge of the display device and e.g. towards an area within the central rear side of the display device, the ambience light sources will be hidden from a direct view.

In one embodiment, the at least one light source is situated towards the central back section of the display device and where the at least one reflector is situated at the periphery of the rear side of the display device.

In one embodiment, the ambience lighting system further comprises at least one optical element placed between the at least one light source and the at least one reflector such that the emitted light passes through the optical element.

Such an optical element may be used for transporting, bending, converging or diverging the emitted light beams. By situating the at least one light source towards the central back section and the reflector at the periphery of the rear side, the bulky ambilight parts (PCB, LEDs) that are typically used in prior art ambience lighting systems is moved away from the edge to the central area of the TV back, which is already thicker, while leaving the smaller reflector at the edge. As mentioned above, an important condition is that the light becomes transferred now over a longer distance between source and reflector without hitting the wall behind the TV. Therefore, the insertion of such an optical element is of a particular advantage.

In one embodiment, the at least one optical element is a light guide. In another embodiment, the at least one optical element is a collimator. The light guide and the collimator may also be used in a combination.

In one embodiment, the optical element is selected from:
  a wedge, or
  a diffuser, or
  a concentrator, or
  a spreader, or
  a flat mirror, or
  an arbitrarily curved mirror, or
  a combination thereof.

One or more of these elements may also be combined with said light guide and/or the collimator.

In one embodiment, the reflector itself is the back of the display device. Thus, the reflector and the back of the display device act as a common element, which results in that the complexity and thickness of the construction is reduced.

In one embodiment, the end of the reflector at the periphery of the rear side of the display device is curved shaped pointing away from the wall behind the display devices. Thus, a sudden brightness at the wall can be avoided and therefore the viewing experience is improved.

In one embodiment, the reflector is at least partly curved shaped where the shaping is adapted to the internal location of the at least one light source so as to distribute the light emitted by the at least one light source to certain areas on the wall. In that way, an optimal light distribution can be realized.

In one embodiment, the reflector comprises one or more of the following:
   textures adapted to realize patterns on the wall,
   a diffuse component.

Accordingly, using textures allows making some specific patterns which might even be adapted for different users. The diffuse finish may be used to make the reflected light more "soft" and thus unwanted light patterns caused by shadows or mirror irregularities may be avoided.

According to another aspect, the present invention relates to a display device comprising the above mentioned ambience lighting system.

In one embodiment, the display device is selected from:
   a LCD device,
   a plasma device,
   an organic light-emitting diode (OLED) device,
   a projection screen.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 1 a) and b) depicts graphically two variations of prior art AmbiLight TV's.

DESCRIPTION OF EMBODIMENTS

Figure 2:
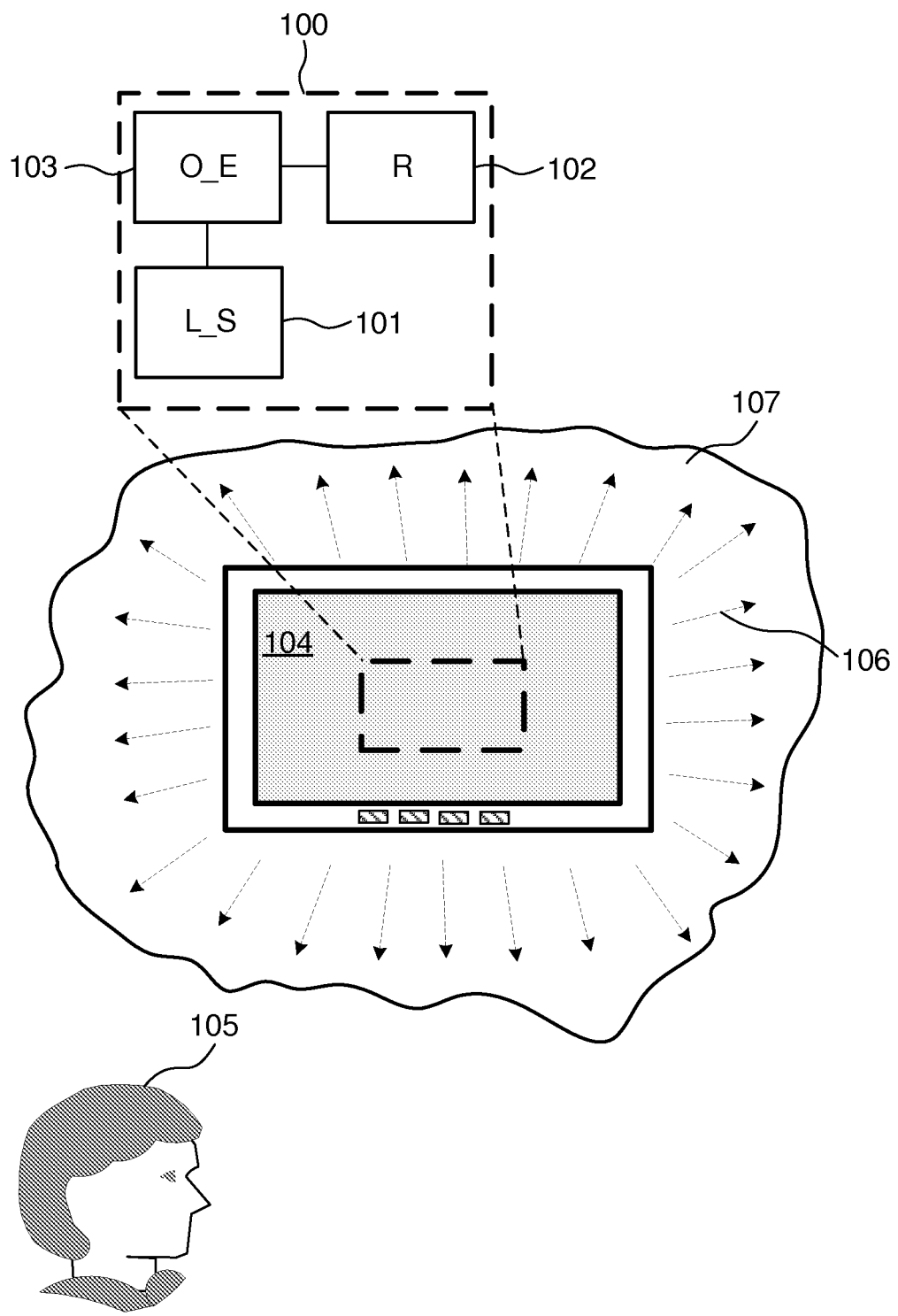
FIG. 2 shows an ambience lighting system for a display device according to the present invention.

FIG. 2 shows an ambience lighting system 100 for a display device 104 according to the present invention, where the ambience lighting system 100 is adapted for emitting an ambience light, indicated by arrows 106, onto a wall 107 behind the display device 104. The display device may be selected from: a LCD device, a plasma device, an organic light-emitting diode (OLED) device, a projection screen, a computer monitor and the like. By the term wall is meant any kind of surface which reflects the light towards a viewer 105 located in front of the display device 104.

The ambience lighting system 100 comprises at least one light source (L_S) 101 and a reflector (R) 102, both being situated at the rear side of the display device 107. In one embodiment, the ambience lighting system 100 further comprises at least one optical element (O_E) 103 placed between the at least one light source (L_S) 101 and the reflector (R) 102 such that the light of the light beams enters the optical element.

As will be discussed in more details in FIGS. 3 and 4, the internal arrangement of the at least one light source (L_S) 101 and the reflector (R) 102 is such that when the display device 104 is placed in proximity to the wall 107 the light 106 emitted by the at least one light source (L_S) 101 becomes reflected by the reflector (R) 102 towards the wall 107 such that the reflected light 106 at least partly peripherally surrounds the viewing area of the display device 104, e.g. at the left and right side, or at the left and right side and the upper and the lower side such that it surrounds the viewing area.

Figure 1A:
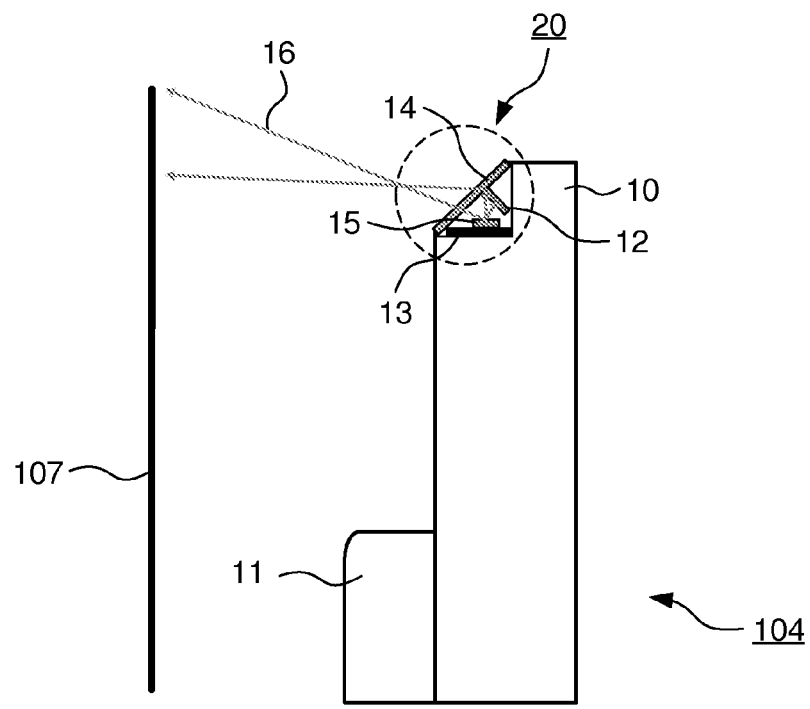
Figure 1B:
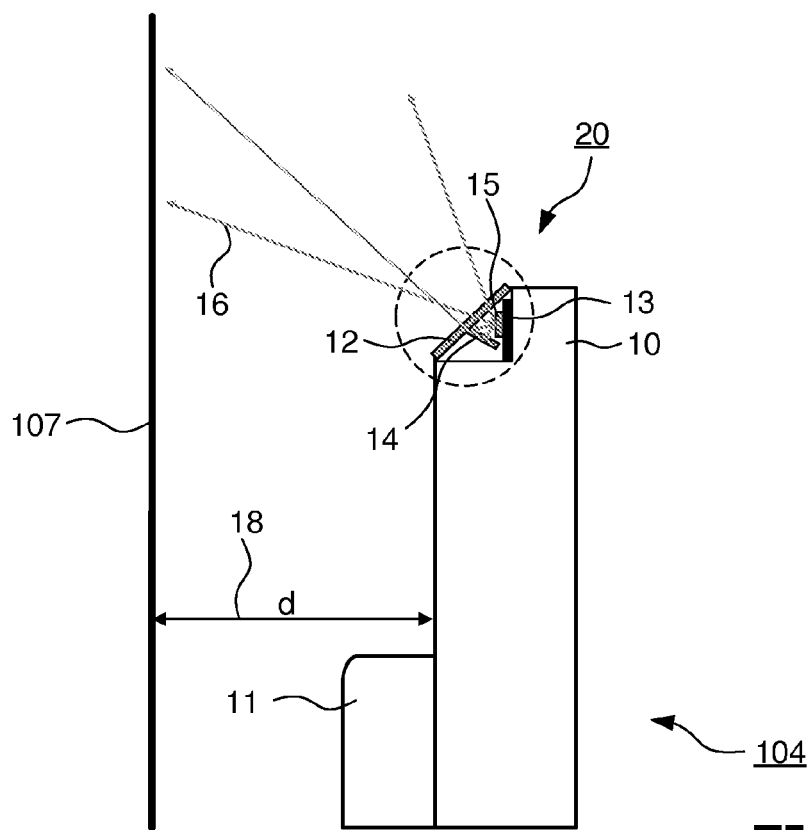
Figure 3:
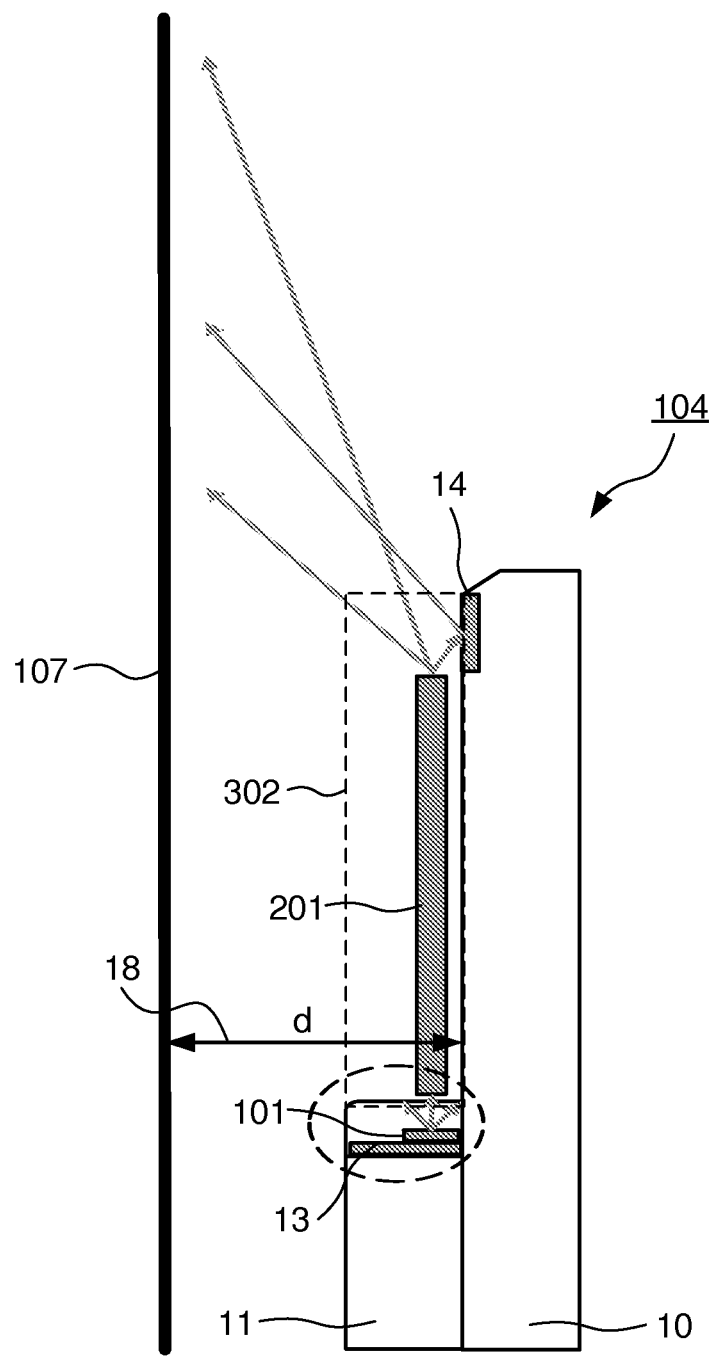
FIG. 3 shows one embodiment of an implementation of the ambience lighting system in an ultra thin display device.

FIG. 3 shows one embodiment of an implementation of the ambience lighting system 100 shown in FIG. 2 in an ultra thin display device 104, e.g. a TV, which is placed at distance d 18 from the wall 107. Although not shown here, the front part 10 in FIG. 3 is much thinner that the front part 10 of a typical prior art AmbiLight TV's where the ambience lighting system is integrated into the front part. Also, the distance d 18 is typically shorter in FIG. 3 than as shown in FIG. 1 because a sufficiently large light path is obtained in the ambience lighting system 100 (which is not the case for the prior art system shown in FIG. 1). The present invention is based on using the space 302 shown by dotted lines that is formed on the back of the display device 104 due to the thicker central back section 11 for hosting the ambience lighting system 100, instead of integrating the ambience lighting system 100 into the front part 10 of the display device 104 as shown in FIG. 1. In the embodiment, the printed circuit board (PCB) 13 and the light source (L_S) 101 are placed at the side of the back section 11. At the periphery of the back section 11, the thin reflector (R) 102 is situated by mounting it to the back of the display device 104. This reflector may extend around the periphery of the display device 104. The optical element (O_E) 103 placed between the light source (L_S) 101 and the reflector (R) 102 is in this embodiment a light guide, which role is to conduct the light from the light source (L_S) 101 towards the reflector (R) 102 and to prevent the light from hitting the wall 107 behind the display device 104. Assuming the light sources are LED's, by its length a good mixing is obtained between the LEDs and a good uniformity, even if the light guide exit is close to wall.

Figure 4:
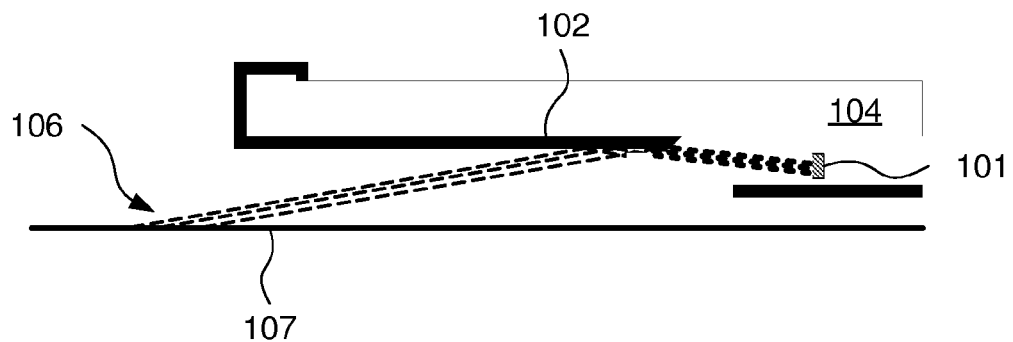
FIG. 4-6 shows another embodiment of an implementation of the ambience lighting system in an ultra thin display device.

FIG. 4 depicts graphically one embodiment of an ambience lighting system 100 according to the present invention where the reflector (R) 102 itself is the back of the display device 104. Accordingly, the appropriate elements are selected for the back of the display device, or the back may be coated with an appropriate element to obtain the necessary reflecting property. As depicted here, the one or more light sources (L_S) 101 may be point like light sources such as LEDs.

The reflector (R) 102 may be made of material suitable to reflect the light in appropriate manner, e.g. the reflector may be a diffuser for diffusing and/or spreading the emitted light towards the wall 107 and may thus give a soft light. Such a diffuser may be selected from ground glass diffusers, Teflon diffusers, holographic diffusers, opal glass diffusers, grayed glass diffusers and the like.

In one embodiment, the reflector (R) 102 has curved shaped end extending upwards and towards the wall to avoid sudden brightness transitions on the wall, and/or shaped so as to concentrate the light in certain area's on the wall and for realizing an optimal light distribution, and/or comprises (macro) textures to realize patterns on the wall. Besides mirror also reflectors (R) 102 with a diffuse component may be used to realize more "soft" light and avoid unwanted light patterns caused by non-flat mirrors at the sides of the reflector are curved shaped pointing towards the wall behind the display devices 104. Other variations of reflectors (R) 102 may also be implemented, e.g. partly shaped reflectors where the shaping is adapted to the internal location of the at least one light source so as to concentrate the light emitted by the at least one light source to certain areas on the wall.

Figure 5:
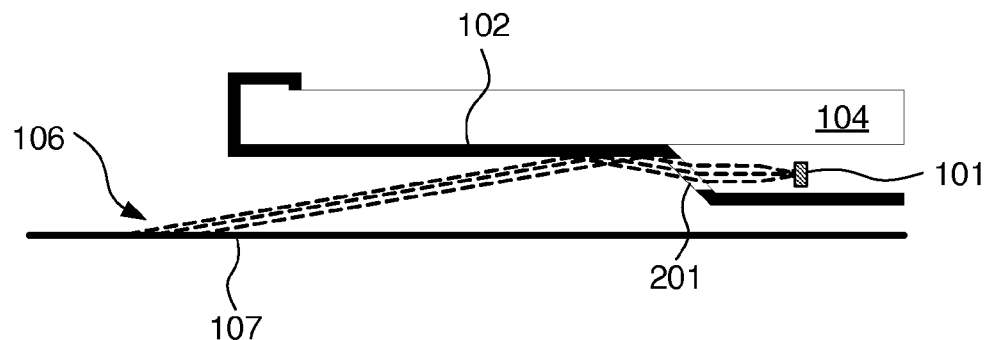

FIG. 5 depicts an embodiment from FIG. 4, showing where an additional optical element (O_E) 103 is placed in the light path of the light beams between the at least one light source 101 and the reflector (R) 102 (see also FIG. 2). Instead of using a light guide as an optical element as depicted in FIG. 3, the optical element can e.g. be a collimator. The collimator is among other things adapted to collimate the Lambertian light from the at least one light source 101, e.g. from the LEDs. The resulting rays are pointed towards the reflector 102, which as mentioned previously can be the back of the display device 104. The reflector then directs the light 106 back towards the wall 107. This two-step approach provides a long light path. At the same time it allows the light to hit the wall from a bigger angle than when pointing the emitted light 106 or light beam from the collimator directly towards the wall 107. This results in a better visibility of the wall structure.

As shown here, the ambience lighting system 100 is located in the same area around the central back section 11 where the other electronics are positioned. This area is currently still required to convert the signals that enter the display from the external box to the correct signals. Even when this area would become redundant, positioning the ambience lighting system 100 at this location would not influence the design aspects of thin sets.

The Lambertian light is collimated using an optical element (O_E) 103, i.e. in this case the collimator. The resulting parallel rays are pointed towards the back of the display device 104 by adding an angle to the light exit point of the optical element (O_E) 103, e.g. a collimator. At the back of the display device 104 the light is reflected again towards the wall 107 to form the ambience lighting area (AmbiLight) that substantially or totally surrounds the display device 104, seen from the point of view of the viewer 105.

The properties of the optical element (O_E) 103 may be adapted to various implementations. As an example, in case the optical element is collimator the collimator may be selected such that the emitted light can be changed to result either in a focused light beam on the back of the set or on a slightly diverging light beam (so that the diverging effect will continue afterwards).

Furthermore, the reflector (R) 102 can be tuned to the total application, where the reflector could be a mirror that might be a design element on the back of the display device 104 as a reflective ring that goes all around the set. The reflector (R) 102 could also be part of the back cover properties itself as mentioned previously. This would be the case where a part of the central back section 11 or the complete central back section 11 of the display device 104 is glossy white.

In one embodiment, the reflector (R) 102 is not completely reflective but should has some diffuse properties to hide imperfections of the optical system and to soften (smooth) the (edges of the) ambience light on the wall 107. Optimalization between reflection and diffuse properties of the reflector (R) 102 (the back cover of the display device 104) may be adapted to the various application.

Other types of an optical element (O_E) 103 in addition to the light guide and the collimator include a wedge, a diffuser, a concentrator, a spreader, a flat mirror, an arbitrarily curved mirror, or a combination thereof.

Figure 6:
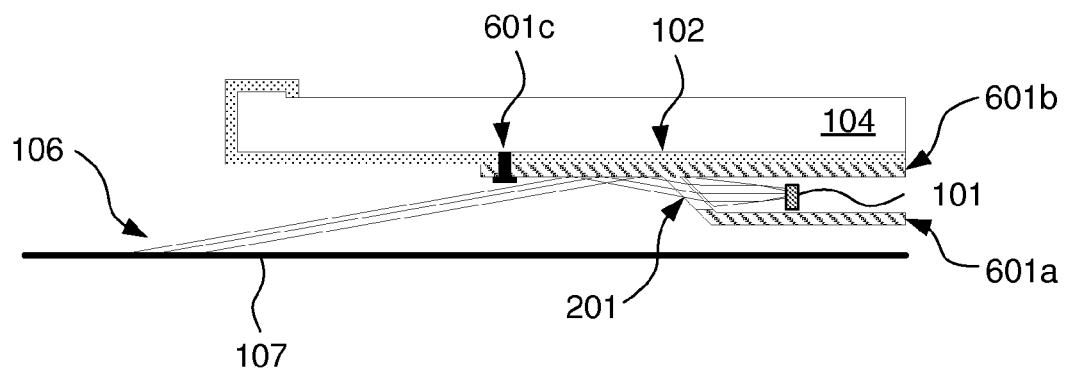

In one embodiment, the ambience lighting system 100 (LEDs, collimator, casing and reflective area) could also be integrated into the wall mounting system 601a-c (e.g. a VESA system) as shown in FIG. 6.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An ambient lighting system for a display device for emitting an ambient light onto a wall behind the display device, comprising:
   at least one light source placed at the rear side of the display device, and
   at least one reflector situated at the rear side of the display device,
   wherein the internal arrangement of the at least one light source and the reflector is such that when the display device is placed in proximity to the wall the light emitted by the at least one light source becomes at least partly reflected by the reflector towards the wall behind the rear of the display device such that the reflected light at least partly peripherally surrounds a viewing area of the display device.

2. The ambient lighting system of claim 1, where the at least one light source is situated towards the central back section of the display device and where the at least one reflector is situated at the periphery of the rear side of the display device.

3. The ambient lighting system of claim 1, further comprising at least one optical element placed between the at least one light source and the at least one reflector such that the emitted light passes through the optical element.

4. The ambient lighting system of claim 3, wherein the at least one optical element is a light guide.

5. The ambient lighting system of claim 3, wherein the at least one optical element is a collimator.

6. The ambient lighting system of claim 3, wherein the at least one optical element is at least one element selected from:
   a wedge,
   a diffuser,
   a concentrator,
   a spreader,
   a flat mirror,
   an arbitrarily curved mirror, and
   a combination thereof.

7. The ambient lighting system of claim 1, wherein the at least one light source is a light emitting diode.

8. The ambient lighting system of claim 1, wherein the reflector itself is the back of the display device.

9. The ambient lighting system of claim 1, the end of the reflector at the periphery of the rear side of the display device is curve shaped pointing away from the wall behind the display devices.

10. The ambient lighting system of claim 1, wherein the reflector is at least partly curved shaped where the shaping is adapted to the internal location of the at least one light source so as to distribute the light emitted by the at least one light source to certain areas on the wall.

11. The ambient lighting system of claim 1, wherein the reflector comprises one or more of the following:
   textures adapted to realize patterns on the wall, and
   a diffuse component.

12. A display device comprising:
   a display;
   at least one light source placed at a rear side of the display, and
   at least one reflector situated at the rear side of the display, wherein an internal arrangement of the at least one light source and the at least one reflector is such that when the display device is placed in proximity to a wall a light emitted by the at least one light source becomes at least partly reflected by the at least one reflector off the rear side of the display towards a wall to the rear of the display such that the reflected light at least partly peripherally surrounds a viewing area of the display.

13. The display device of claim 12, wherein the display device is selected from:
   a LCD device,
   a plasma device,
   an organic light-emitting diode (OLED) device, and
   a projection screen.

\* \* \* \* \*